July 11, 1939.  C. E. McCORMICK  2,165,399
TRIM MOLDING
Filed Aug. 28, 1934  5 Sheets-Sheet 1

INVENTOR
Charles E. McCormick

July 11, 1939.  C. E. McCORMICK  2,165,399
TRIM MOLDING
Filed Aug. 28, 1934   5 Sheets-Sheet 2
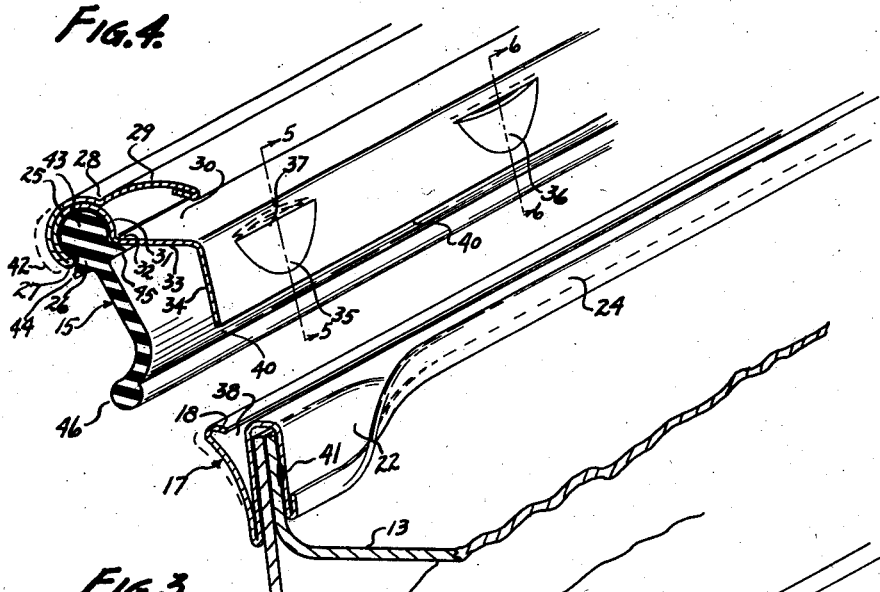
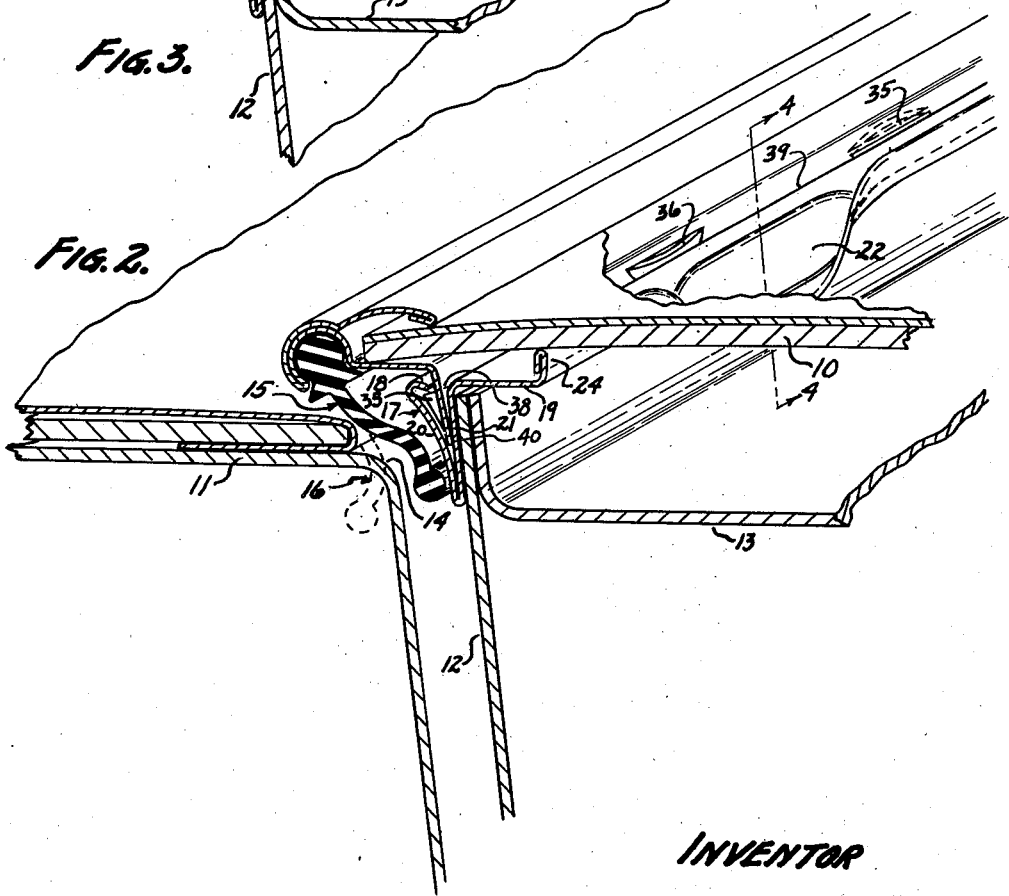
INVENTOR
Charles E. McCormick July 11, 1939. C. E. McCORMICK 2,165,399
TRIM MOLDING
Filed Aug. 28, 1934 5 Sheets-Sheet 3
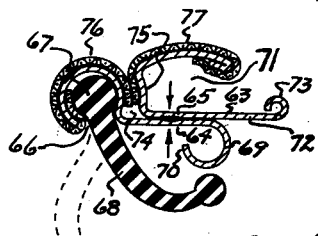
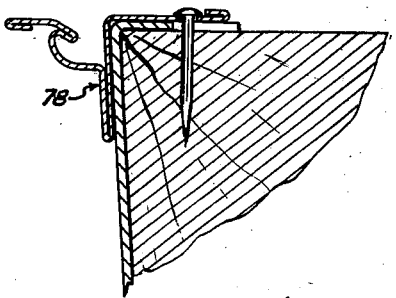
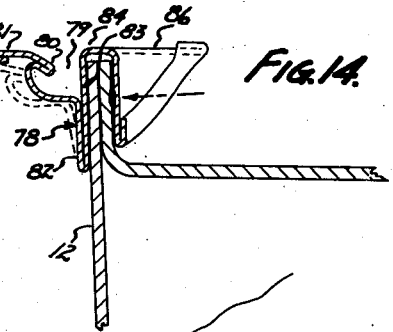
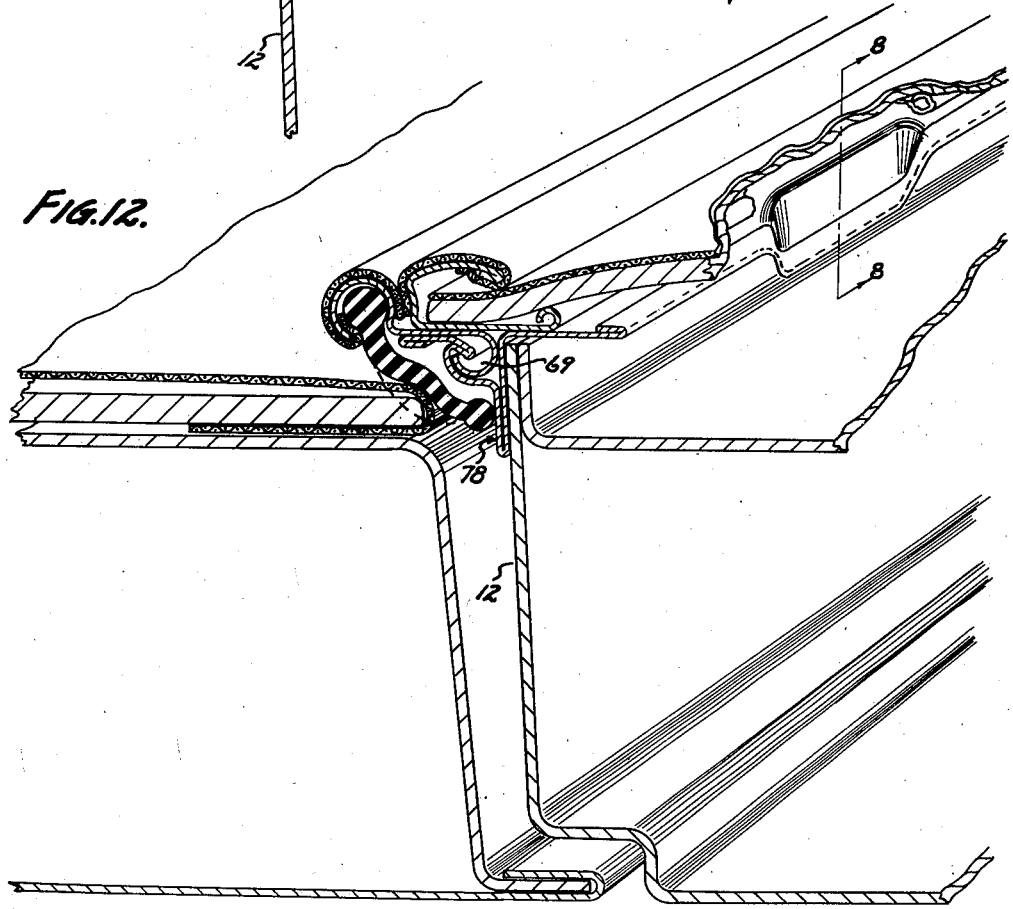
INVENTOR
Charles E. McCormick July 11, 1939.   C. E. McCORMICK   2,165,399
TRIM MOLDING
Filed Aug. 28, 1934   5 Sheets-Sheet 4

INVENTOR
Charles E. McCormick

July 11, 1939.　　　C. E. McCORMICK　　　2,165,399
TRIM MOLDING
Filed Aug. 28, 1934　　　5 Sheets-Sheet 5
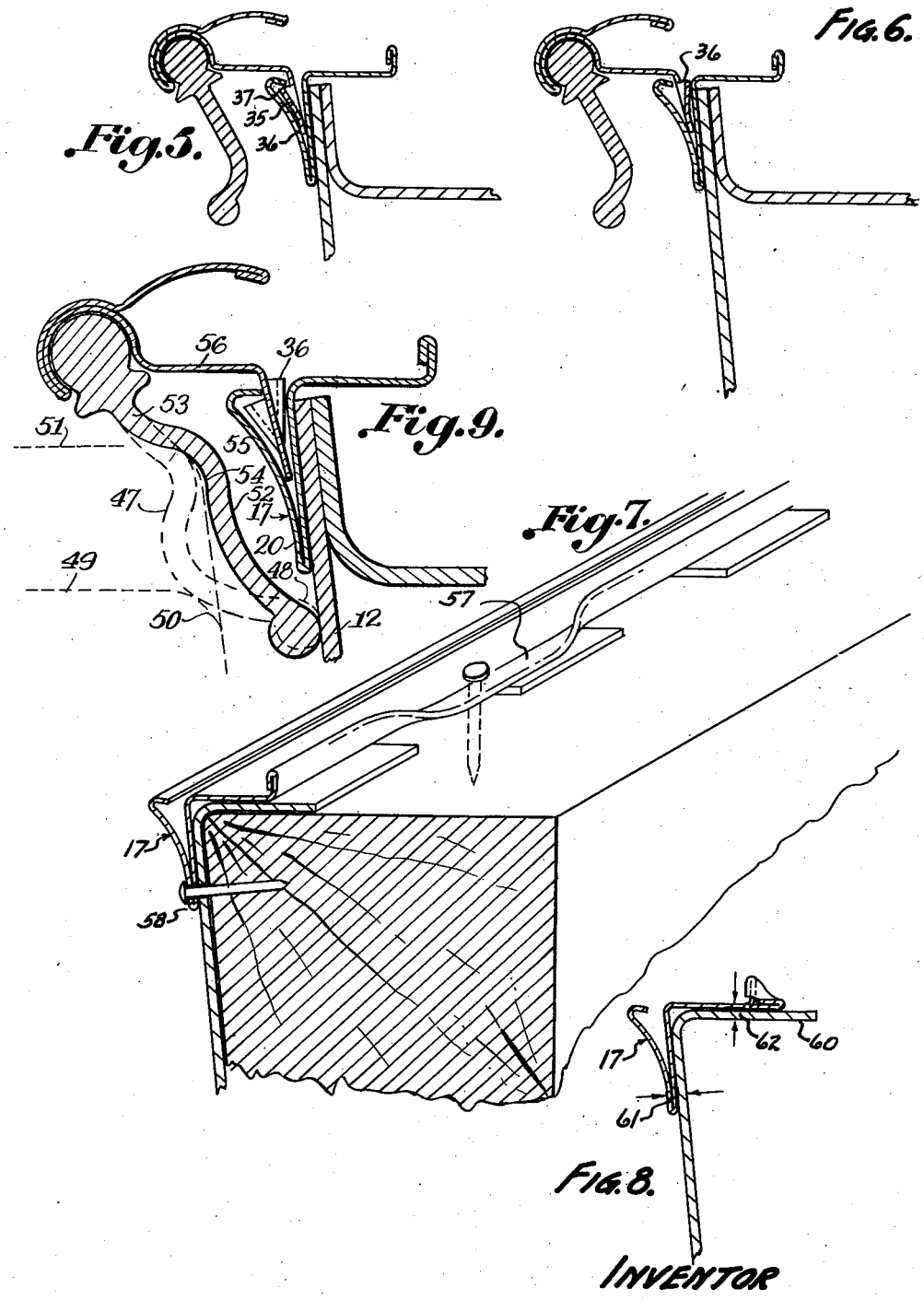
INVENTOR
Charles E. McCormick Patented July 11, 1939

2,165,399

UNITED STATES PATENT OFFICE 2,165,399

TRIM MOLDING

Charles E. McCormick, Dearborn, Mich.

Application August 28, 1934, Serial No. 741,831

10 Claims. (Cl. 296—44)

This invention relates generally to finish or trim moldings, and particularly to combination door sealing, panel retaining, finish moldings, for automobile body interiors.

One objection to the above type of molding, as disclosed by the prior art, is its wide and bulky appearance. This wide appearance is inherent and necessary in these prior moldings because the flexible sealing portion is visible when the door is closed, and lies immediately adjacent to the panel retaining portion.

My molding is of considerably lesser width and of more pleasing proportions because the flexible sealing portion or flange is located underneath the panel retaining portion, one edge of the said sealing flange being secured in the outer edge of the molding adjacent the panel retaining portion, the free part of the said sealing flange extending toward the face of the door opening, in contrast to the prior art where the sealing member extends away from the face of the door opening. My sealing flange is invisible when the door is closed. Because my sealing flange is invisible, as described in the foregoing, it is unnecessary to cover the same with fabric as is the case with other moldings.

Other door sealing moldings and so-called windlaces have a marked tendency to pinch along the hinge side of the door between the face of the pillar and the frame of the door, and various methods of adjustment and extra work are necessary to offset this tendency.

In my invention there is no tendency to pinch or buckle the sealing flange at the hinge side of the door, because at that point the edge of the door first contacts the flange nearest its secured edge, and then sliding along the flange toward its free edge, deflects said flange aside, until the edge of the door reaches its final position with said flange in sealing contact therewith. On the sides of the door other than the hinge side, the edge of the door first contacts the sealing flange near its free edge and slides along the flange toward its secured edge, but the initial contact of door with flange is at a point on the flange slightly past the extreme free edge of the flange, so that the flange is deflected to one side, until the edge of the door reaches its final position with said flange in sealing contact therewith.

In prior moldings of great width where the entire molding is covered with fabric, considerable expense is necessary in forming curves due principally to the difficulty of forming the fabric cover without wrinkles.

The preferred form of my invention consists of two units. The first unit is the retaining channel which is formed to cross section shown in the drawings, bent to the contour of the door opening, and spotwelded or otherwise attached to the body before the body is painted. The second unit is the molding unit completely finished and including the flexible sealing flange which is made preferably of rubber compound. After the body is completely painted and ready for interior trimming, the second or molding unit is snapped into engagement with the first unit which has been previously attached to the body. The interior trim panels are then assembled with their edge lying in the panel slot along the inside edge of the molding as shown in the drawings.

One of the most important objects of my invention is the provision of a method of engagement between the two units described above whereby the molding unit may be snapped into engagement with the retaining channel unit with the least effort and in the shortest possible time. There are several examples in the prior art where two metal moldings are snapped together, one example being the two piece steel drip molding which has been used for several years. However, the principles involved in that construction have disadvantages which I have overcome. The engagement of these prior steel moldings usually requires considerable force such as a hammer blow, and the distorting of the members is short and stiff. Further the engaging portions of the prior moldings are relatively wide transversely and therefore stiff transversely, and would not satisfactorily conform to and lie closely to a line such as the line of the door opening. In my retaining channel unit the engaging portion consists of a narrow and deep channel which easily follows reasonable variation in the contour of the door opening. Where necessary on curves the horizontal attaching flange may be cut away leaving only the narrow engaging channel, which is extremely flexible and adaptable.

Other structural details will be brought out in the specification and claims. It is to be understood that this invention is not limited in its application to the details of construction and arrangement of parts illustrated in the accompanying drawings, since the invention is capable of other embodiments and of being practised or carried out in various ways. The phraseology or terminology employed herein is for the purpose of description and not of limitation, and it is not intended to limit the invention beyond the several claims hereto appended or the requirements of the prior art.

The invention will be more clearly understood from the following description in conjunction with the accompanying drawings, in which, Fig. 1 is an elevation of one side of the interior of a four door automobile body, showing one front and one rear door, and embodying this invention.

Fig. 2 is a perspective cross sectional view taken on the line 2—2 of Fig. 1.

Fig. 3 is a cross sectional view of the metal retaining channel taken on the line 3—3 of Fig. 1 and the line 4—4 of Fig. 2.

Fig. 4 is a cross sectional view of the molding unit including sealing flange, detached from the body, the section being taken along the line 2—2 of Fig. 1.

Fig. 5 is a cross sectional view thru molding unit, retaining channel, a portion of the interior edge of the door opening, and thru the center of the engaging depression at the line 5—5 of Fig. 4.

Fig. 6 is a cross sectional view thru molding unit, retaining channel, a portion of the interior edge of the door opening, and thru the center of the engaging depression at the line 6—6 of Fig. 4.

Fig. 7 is a perspective cross sectional view of the metal retaining channel showing method of application to the interior edge of the door opening of a composite body having a wood framing.

Fig. 8 is a cross sectional view of the metal retaining channel showing method of application to a steel body pillar having an inturned flanged edge.

Fig. 9 is an enlarged cross sectional view of the molding unit including sealing flange, retaining channel applied to a body pillar, and showing the outline of a cross section of the door in two positions and showing the door's relation to the rubber sealing flange.

Fig. 12 is a perspective cross sectional view of this invention with further variation in detail design.

Fig. 13 is a cross sectional view of the molding unit including sealing flange, before engagement with the retaining channel, as shown in Fig. 12.

Fig. 14 is a cross sectional view of the retaining channel at the line 8—8 of Fig. 12, showing in detail the method of attachment to the steel body pillar of Fig. 12.

Fig. 15 is a cross sectional view of the retaining channel of Fig. 12, showing method of application to a composite or wood framed body pillar.

Figure 1:
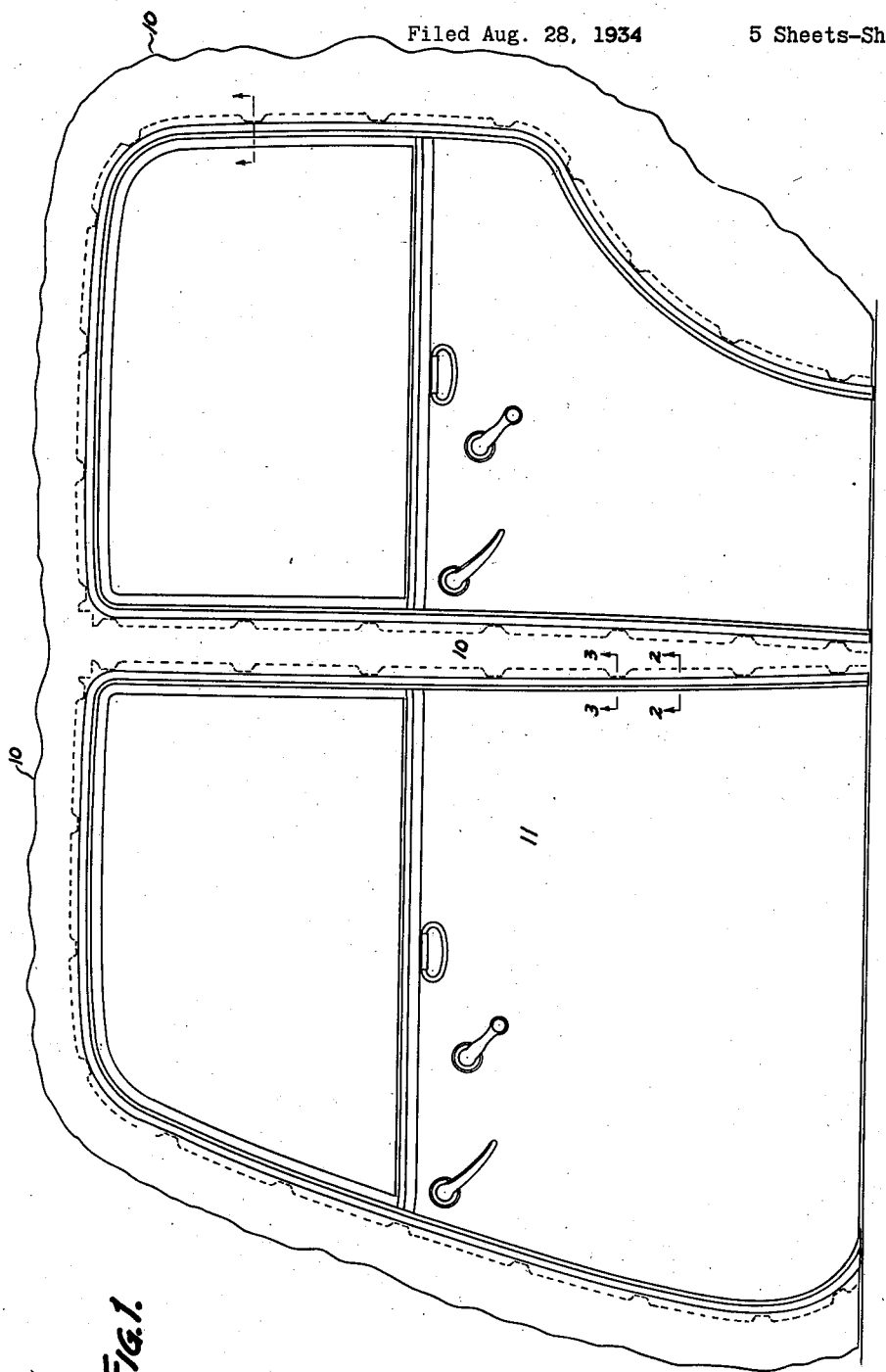

Referring to Figs. 1 and 2, an automobile body embodying this invention comprises interior paneling 10, a door 11, door opening having a face 12 which is identical with the face of the pillar, an inner steel body panel 13 spotwelded to the inner edge of the pillar face 12. The door is mounted to swing on hinges (not shown), the location of the hinges whether at the forward or the rear side being immaterial for the purpose of this invention, since the constructions here shown are designed to operate efficiently on all sides of the door. However, the movement of the inner edge 14 of the door, in relation to a sealing flange 15 to be later described, is different on the hinge side from the movement on the other sides of the door. On the hinge side of the door the edge 14 of the door 11 when closing moves in the arc of a circle toward the sealing flange 15, but for the purpose of this description the edge 14 of the door 11 may be considered to move in a line substantially perpendicular to the face 12 of the door opening. This movement of the edge 14 of the door pushes the sealing flange 15 from its normal dotted position at 16 to its flexed position as shown, where the crack between the door 11 and the door opening 12 is effectively sealed by the elastic pressure of the sealing flange 15. On the sides of the door other than the hinge side, the edge 14 of the door 11 moves in a line approximately parallel to the face 12 of the door opening, and upon striking the sealing flange 15, deflects the flange from its dotted position 16 to its final position as shown, where the pressure of the sealing flange 15 effectively seals the crack between the door 11 and the door opening 12.

The sealing flange 15 forms a part of the molding unit as shown in Fig. 4, and the molding unit is adapted to cooperate with retaining channel 17 comprising a V shaped channel with one side 20 curved concavely viewed from the outside of the channel, and the other side 21 straight to lay against the face 12 of the door opening. One edge 18 is turned inwardly, and the other edge 19 is flanged outwardly in a direction approximately perpendicular to the straight side 21, so that the flange 19 lies in a plane substantially parallel to the interior wall surface of the body. At intervals the flange 19 is further formed as at 22 where it lies against the inside of the flanged edge of the inner steel body panel 13. The construction here shown in Fig. 2 is of an all steel body, and in this case the formed portions 22 are spotwelded to the body as shown in Fig. 3, the weld taking place at 41, and thereby providing a simple and rigid fastening of the retaining channel 17 to the body. The free edge of the flange 19 is upturned to provide a support 24 for the trim panel 10.

Referring to Fig. 4, the molding unit comprises a formed sheet metal molding doubled upon itself at one edge to form a channel 25 of circular cross section having an opening 26, the doubled edge 27 of the molding being one side of the channel 25. The doubled metal extends from the edge 27 to the point 28 where one layer of metal 29 branches away in a direction approximately perpendicular to the side of the channel 25, to form one side of the panel slot 30. The other layer of metal forms the single ply side 31 of the channel 25, and extends to the edge 32 of the opening 26. At the point 32 this layer of metal is bent at approximately a right angle to form the side of the panel slot 30. The side 33 is extended and again bent at substantially a right angle to form the engaging flange 34. Engaging depressions 35 are formed and offset from the plane of the engaging flange in a direction toward the outer edge of the molding. Engaging depressions 36 alternate with depressions 35 at successive intervals along the length of the engaging flange 34, the depressions 36 being formed and offset from the plane of the engaging flange in the opposite direction from the depressions 35. Cross section of depression 35 is shown in Fig. 5 and cross section of depression 36 is shown in Fig. 6. Depression 35 is sheared along the line 37 and pushed from the plane of the flange 34 to the position best shown in Fig. 5, where it can be seen that the depression is wedge shaped and tapers from the point 38 to the sheared offset edge 37. Depression 36 is of the same form as 35.

When the molding unit of Fig. 4 is snapped into engagement with the retaining channel 17 as shown in Fig. 2, the tapered form of the depressions 35 and 36 gradually spread the opening 38 of the retaining channel 17 until the inturned edge 18 snaps over and interlocks with the depression 35. The depressions 36 are tight against the edge 39, the extreme edge 40 of the engaging flange 34 is wedged between the sides 20 and 21 of the retaining channel 17. The molding unit is therefore rigidly and positively held by the retaining channel 17.

Referring again to Fig. 4, the open channel 25 receives and holds the rubber sealing flange 15 by bending the channel 25 from the dotted position 42 to the closed position shown by the drawings. The secured edge of the sealing flange 15 is formed in the shape of a bead 43 of the proper size to fit in the channel 25 when closed. The positioning edges 44 and 45 are an integral part of the sealing flange 15 and hold the flange in correct position, preventing the circular bead 43 from turning in the circular channel 25. The sealing flange 15 is extended in the general direction of the engaging flange 34, or when assembled as in Fig. 2, the sealing flange extends in the direction of the face 12 of the door opening. The main portion of the sealing flange 15 is relatively thin and flexible, and terminates at its free edge in a round stiffening bead 46 which serves to hold the thin portion of the sealing flange 15 in a uniform unwaving shape both during the process of manufacturing the rubber flange 15 and also after assembly in the body.

Fig. 9 shows the preferred form of the sealing flange. In its free and normal position, the rubber sealing flange is in the position 47 shown by dashed lines. In this position, the stiffening bead lies against the face 12 of the door opening with a very slight pressure. The dotted line 49 is the outline of the door at a position during its closing when it is moving substantially parallel to the face 12 of the door opening, and has arrived at a point where it has just touched the sealing flange at 50. The final closed position of the door is shown by the dotted line 51. In moving from position 49 to position 51, the door has pushed and flexed the sealing flange from the dashed position 47 to its final position 52, and the crack between the door opening 12 and the door is effectively sealed. The action of the door in closing is soft and flexible beginning at the initial position 49 and at that point requires only a slight force to flex the sealing flange. This initial contact is soft because of the relatively great distance between the point of application of the force 50 and the point of greatest bending at 53, which arrangement gives the door considerable leverage on the sealing flange. As the door moves, this leverage becomes less and less until in the final closed position, the sealing flange exerts the maximum resistance to flexing, with contact with the door at 54. Due to the double reversed bend in the normal shape of the sealing flange, the door will always deflect the sealing flange in the proper direction into the corner 55 formed by the extended molding unit 56 and the curved side 20 of the retaining channel 17.

Fig. 7 shows the application of the retaining channel 17 to the door opening of a wood frame body by means of nails. In this application the only difference in the retaining channel 17 lies in the formation of the flange at 57 to provide a wider and more substantial base to lie upon the inner surface of the body. In this application it is desirable to insert a few nails thru the lower edge 58 of the retaining channel 17, for greater stability. The molding unit shown in Fig. 4 can then be snapped into the retaining channel of Fig. 7.

Fig. 8 shows application of retaining channel 17 to a steel body door opening having an inturned flange edge 60. The retaining channel 17 is formed in the same manner as in Fig. 7, except there are no holes for nails, since in his case the retaining channel 17 is spotwelded to the body at the points 61 and 62, the arrows showing the direction of pressure of the welding electrodes (not shown).

Figure 10:
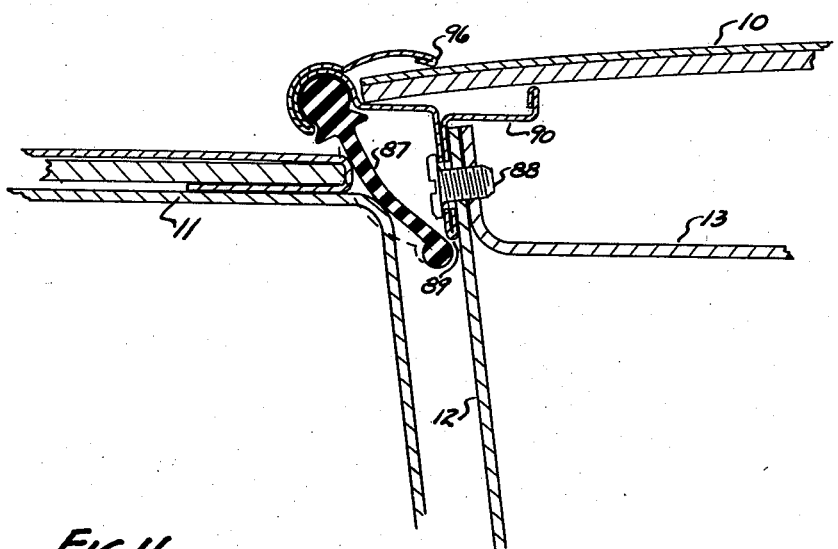
Fig. 10 is a cross sectional view showing this invention with variations in detail design.

Fig. 10 shows another embodiment of this invention in which the molding unit of Fig. 4 and a part of the retainer channel of Fig. 3 are combined in a single unit, in which the entire metal part is integral and formed from one strip of sheet metal. This unit is completely finished and assembled with the rubber sealing flange 87, and then attached to the body door opening 12, preferably with self tapping metal screws 88, after the body is fully painted and ready for assembly of the interior trim. During the operation of attachment to the body, the sealing flange 87 is bent away from the attaching flange 89 as each screw is inserted. After the unit is assembled to the body, it functions in the same manner as the construction shown in Fig. 2. If the screws 88 are used entirely around the door opening as the sole means of attachment, then it is not necessary to further form the flange 90 (as was done at 22 in Fig. 2). If the unit of Fig. 10 is applied to a wood frame shown in Fig. 7, then it may be desirable to use nails instead of screws, inserting the nails thru the flange 89 and also forming the flange 90 and inserting nails as at 57 in Fig. 7.

Figure 11:
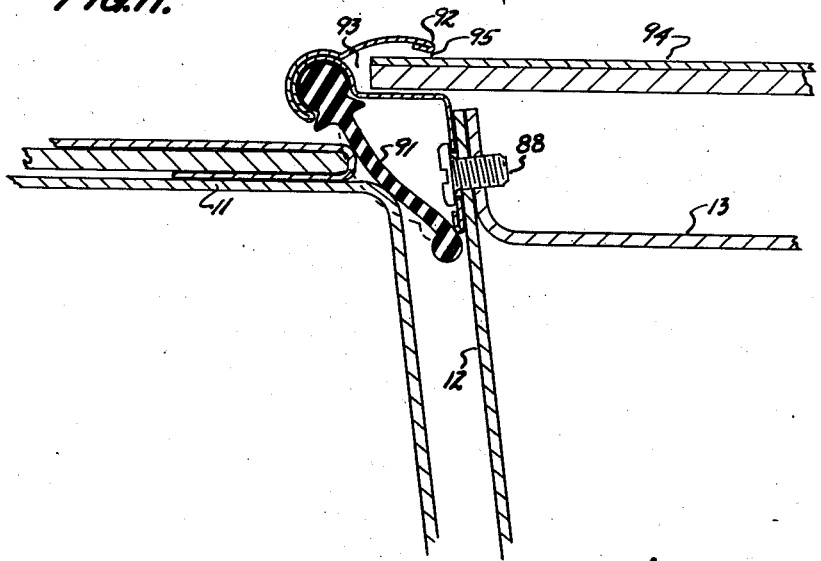
Fig. 11 is a cross sectional view showing this invention with further variations in detail design.

Fig. 11 shows a simplified embodiment of this invention where the molding unit of Fig. 4 (excepting the depressions 35 and 36) is attached directly to the body, preferably by means of self tapping metal screws. The unit is fully finished and assembled with the sealing flange 91 and attached to the body after the same has been painted and is ready for assembly of the interior trim. After assembly to the body, this construction seals the door in the same manner as the constructions of Fig. 2 and of Fig. 11. It will be noted that there is no flange and panel support (as 24 in Fig. 2) and that the edge 92 of the panel slot 93 does not exert pressure on the trim panel 94. The part 94 lies flat and the edge of the panel lies loosely in the panel slot 93, which condition is likely to leave an irregular opening at 95 in contrast with the neat and tight contact of the molding with panel at 96 of Fig. 10. However, the embodiment of Fig. 11 is simple, costs less than the other constructions shown, and may be suitable for some conditions of use.

Figs. 12, 13, 14, and 15, show a construction within the broad idea of my invention but illustrating the possibility of varying the details of design. In Fig. 13 the molding unit comprises two separate pieces of metal 63 and 64 joined together by spotwelding at 65 with direction of pressure of the welding electrodes (not shown) indicated by the arrows. Part 64 ends on one side in an open channel 66 which is closed about the bead 67 of the sealing flange 68. The opposite end 69 of part 64 is formed into a hook shaped engaging edge 70. Part 63 is formed into the general shape of an open channel 71 which serves for the panel slot. One side 72 is extended beyond the panel slot opening and ends in a curled edge offset inwardly of the channel 71. A relatively deep groove 74 is formed between the side of the open channel 66 and the base 75 of the panel slot 71. The exterior surface of the channel 66 is covered with a strip of fabric 76, and the outer surface of the exposed portion of the panel slot 71 is covered with a second strip of fabric 77. The two adjacent meeting edges of the fabrics 76 and 77 are forced into the groove 74, making a neat and secure joint. This construction makes possible the use of two strips of fabric of contrasting appearances. Another advantage of this consruction is the easy forming of the fabric covering into a curve, because of the independent application of the two strips of fabric.

In Fig. 14 the retaining channel 78 is formed of a channel 79 having one edge 80 inturned and the metal doubled back upon itself to extend away from the channel 79 to form a supporting shaft 81. The bottom of the channel 78 is extended a relatively great distance downward, the metal being doubled upon itself at 82. The straight side 83 of the channel 78, is flanged outward at 84 in the same manner as the channel retainer 17 in Fig. 2. The attachment of the retainer channel 78 to the body is accomplished by the same method described in the first embodiment of Fig. 2. When the molding unit of Fig. 13 is snapped into engagement with the retaining channel of Fig. 14, the curved portion 69 spreads the points 80 and 84 of the channel 78 until the engaging edge 70 of the molding unit interlocks with the engaging edge 80 of the retaining channel. After interlocking, there is pressure exerted upon the curved portion 69 by the sides of the channels 83 and 85, and the molding unit rests on the extended flanges 81 and 86, thereby securely engaging the molding unit with the retaining channel.

Fig. 15 shows the application of the retaining channel 78 of Fig. 14 to a wood frame body by means of nails.

It will thus be seen that I have designed a molding of extreme narrowness and the fabric cover may be curved with little difficulty; one variation of my design permitting the covering of the molding with two separate strips of fabric applied independently and parallel to each other, one strip covering the inner edge of the molding and the other strip covering the remaining visible portion of the molding. This variation in design further reduces the difficulty of forming the fabric on curves. Most of the drawings show moldings without fabric cover. Any one of a variety of finishes may be applied to the steel part, such as, lacquer paint or enamel, chrome or other plating, fabric, artificial leather or genuine leather. The finish does not affect the broad idea covering the mechanical work done by the molding, namely, sealing the door to prevent drafts and dust from entering the car, the holding of the interior trim panels in position, and the neat finishing of the interior edges of the door opening.

Due to the relatively great depth of the retaining channel, its edges may be spread with very slight force, the principal bending taking place at the extreme bottom, with only slight distortion of the metal at that point, well within the elastic limit, while allowing a comparatively great movement of the engaging edges of the channel. This great movement is very desirable and is in marked contrast to prior engaging channels, where the reverse is true, that is, there is comparatively smaller movement of the engaging edges of the channel, and a relatively larger amount of actual distortion in the metal itself. The engaging flange projecting from my molding unit, consists of a single thickness of metal having a series of shallow depressions formed therein, one edge of each depression being sheared thru and the metal of the depression pushed slightly out of alignment with the surface of the engaging flange. The depressions are alternately pushed first from one side of the engaging flange and then from the other side. When the engaging flange of the molding is pushed into the retaining channel, the tapered form of the depressions on the sides of the engaging flange gradually and easily spread the edges of the retaining channel until one edge of the engaging channel, which is turned inwardly, snaps over and interlocks with the sheared edge of the depressions on one side of the engaging flange. The opposite side of the retaining channel exerts pressure on the adjacent depressions of the engaging flange, and in addition, the extreme edge of the engaging flange being wedged between the sides of the retaining channel in the lower part of the V, this combination of actions holds the molding unit in rigid and positive engagement. The action of these intermittent depressions of one member with the continuous inturned edge of the other member, is very desirable, for the reason that each single depression snaps into place separately and successively, and the two members are more easily and positively interlocked, than if both interlocking edges were continuous, as is the case in the prior art.

It will further be seen that the retaining channel must have a normal opening, when not spread, sufficient to allow the insertion of a bending tool (not shown) used in bending the channel to the contour of the door opening. In order that the engaging flange of the molding unit may fill up this opening, is one of the reasons that the depressions were made on the side of the engaging flange opposite to the locking side thereof. The series of depressions on the locking side are of the same form as the foregoing depressions but their engagement with the retaining channel is different as explained in the foregoing.

The preferred method of making the metal portion of the molding unit (including the engaging flange) is, first, to roll form the entire metal portion of said unit in practically continuous length from coiled strip steel. Then, both series of depressions, described in the foregoing, will be formed successively and automatically, preferably, by a series of dies arranged around the circumference of two coacting rolls between which the molding is fed. The molding is then cut to length and bent to the contour of the door opening.

It will be noted that my retaining channel is shaped to occupy the least possible space between the face of the door opening and the face of the door. One edge of the channel is inturned for the purpose of interlocking with the engaging flange of the molding unit, while the opposite edge is extended at approximately a right angle to the side of the retaining channel for the purpose of providing an attaching flange for fastening the retaining channel to the body.

This attaching flange may be used in the right angle position or it may be depressed or formed at intervals to conform to different structural conditions in the body. The extreme edge of said attaching flange is upturned to provide a rest for the trim panel when it is inserted in the panel slot in the molding unit. As will be noted in the drawings, this rest exerts on the panel an upward force, which operating in conjunction with the downward force exerted by the overlying edge of the molding unit, imparts a convex surface to the trim panel which is highly desirable from an appearance standpoint. Due to the foregoing construction there will always be a tight and neat appearing conjunction where the overlying edge of the molding unit is in contact with the outer surface of the trim panel.

What I claim is:

1. In combination with an automobile body having a frame, a door, a sheet metal retaining member on the face of the frame, and a molding unit having a metal flange engaged with the said retaining member.

2. In combination with an automobile body having a door opening, a door, a retaining member attached to the body adjacent the inner edge of the door opening, and a molding unit including a series of projections engaged with the said retaining member.

3. In combination with an automobile body having a door opening frame, a door, an expandible channel retaining member secured to the frame, and a molding unit having a rigid member engaged therewith.

4. In combination with an automobile body having a door opening frame, a door; retaining means attached to the door opening frame, and including an elastic expandible channel having one edge inturned, and one edge outturned to provide an attaching flange and trim panel support; and a molding unit engaged therewith, and including a finish molding attached to and projecting beyond the edge of said door opening and overlying the edge of said door, said finish molding having along its inner edge an open slot for receiving and holding the edge of a trim panel, and a flexible sealing flange having one edge secured in the outer overlying edge of the finish molding, the free edge of said sealing flange projecting toward the face of the door opening frame and lying underneath the overlying portion of said finish molding.

5. A molding assembly, for concealing the crack between opposed frame members, comprising a resilient metal retaining member lying between said frame members, and a finish molding entirely overlying the said crack, the finish molding having an extended metal portion engaged with said retaining member.

6. In combination with an automobile body, a door opening frame having an inwardly extending flange, a door, and a finish molding member carried by said flange and having an extended sheet metal portion engageable with the face of the flange farthest away from said door, a portion of said molding being bent to extend laterally across the crack between the door and the flange.

7. In combination with an automobile body, a door opening frame having an inwardly extending flange, a door, and a molding assembly carried by said flange and having an extended sheet metal portion engageable with the face of the flange farthest away from said door, a portion of said molding being bent to extend laterally across the crack between the door and the flange, said bent portion being continued to form a slot for receiving one edge of a trim panel.

8. In combination with an automobile body having a door opennig frame with an inwardly extending flange, a body panel with an inwardly extending flange, a door, a sheet metal retaining member having a channeled portion engageable with said flanges and extending inwardly a predetermined distance with respect to said door, and a finish molding connected to said retaining member and extending transversely and completely across the crack between the door and the frame.

9. In combination with an automobile body having a door opening frame with an inwardly extending flange, a body panel with an inwardly extending flange, a door, a sheet metal retaining member having a channeled portion engageable with said flanges and extending inwardly a predetermined distance with respect to said door, a finish molding connected to said retaining member and extending transversely across the crack between the door and frame, and a flexible sealing strip carried by said molding for contacting with the door and so positioned as to be substantially concealed when the door is closed.

10. In combination with an automobile body having a door opening frame with an inwardly extending flange, a door, a sheet metal retaining member having a portion engageable with the side of said flange farthest away from the door and extending inwardly a predetermined distance with respect to said door, a finish molding attached to said retaining member and extending transversely across and entirely covering the crack between the door and frame, and a flexible sealing strip carried by said molding for contacting with the door and so positioned as to be concealed when the door is closed.

CHARLES E. McCORMICK.